(12) United States Patent
Khwaja et al.

(10) Patent No.: US 7,943,048 B2
(45) Date of Patent: May 17, 2011

(54) METHODS FOR RECOVERING TALLOW FROM WASTEWATER

(75) Inventors: Abdul Rafi Khwaja, Upper Gwynedd Township, PA (US); Stephen R. Vasconcellos, Doylestown, PA (US)

(73) Assignee: General Electric Company, Schenectady, NY (US)

( * ) Notice: Subject to any disclaimer, the term of this patent is extended or adjusted under 35 U.S.C. 154(b) by 223 days.

(21) Appl. No.: 12/111,345

(22) Filed: Apr. 29, 2008

(65) Prior Publication Data

US 2009/0266769 A1    Oct. 29, 2009

(51) Int. Cl.
*C02F 1/56* (2006.01)
*C02F 103/22* (2006.01)

(52) U.S. Cl. ........ 210/705; 210/710; 210/725; 210/728; 210/730; 210/734; 210/737; 210/905; 530/859

(58) Field of Classification Search .................. 210/710
See application file for complete search history.

(56) References Cited

U.S. PATENT DOCUMENTS

| | | | |
|---|---|---|---|
| 2,875,222 A * | 2/1959 | Dormitzer | 554/8 |
| 3,974,069 A * | 8/1976 | Nettli | 210/708 |
| 4,119,495 A * | 10/1978 | Belyaev et al. | 435/243 |
| 4,744,903 A | 5/1988 | McAninch et al. | |
| 4,744,904 A * | 5/1988 | McAninch et al. | 210/632 |
| 4,933,087 A | 6/1990 | Markham, Jr. et al. | |
| 5,200,085 A * | 4/1993 | Rudolf et al. | 210/703 |
| 5,543,058 A | 8/1996 | Miller | |
| 5,643,462 A | 7/1997 | Chen et al. | |
| 5,846,436 A | 12/1998 | Chen et al. | |
| 6,372,145 B1 | 4/2002 | Tarbet et al. | |
| 6,676,840 B2 * | 1/2004 | Tarbet et al. | 210/710 |
| 2004/0173538 A1 | 9/2004 | Stewart | |
| 2008/0149569 A1 | 6/2008 | Rai et al. | |

FOREIGN PATENT DOCUMENTS

EP    0630858 A    12/1994

OTHER PUBLICATIONS

Steele, et al, "Elimination of DAF Sludge Disposal Through Resource Recovery." Food Processing Waste Conference, Nov. 6-8, 1989, Atlanta, GA (USA) pp. 297-309.
WO Search Report Issued in PCT/US2009/037955 issued on Sep. 7, 2009.

* cited by examiner

*Primary Examiner* — Peter A Hruskoci
(74) *Attorney, Agent, or Firm* — Wegman, Hessler & Vanderburg

(57) ABSTRACT

A method for recovering tallow from meat processing wastewater includes adding a coagulant composition to the wastewater to agglomerate suspended fat, oil and grease particles in the wastewater, separating solid waste materials from the wastewater and isolating tallow from the solid waste materials. The coagulant composition includes tannin.

11 Claims, No Drawings

METHODS FOR RECOVERING TALLOW FROM WASTEWATER

FIELD OF THE INVENTION

This invention relates generally to the recovery of tallow from wastewater and more particularly, to the recovery of tallow from meat processing wastewater.

BACKGROUND OF THE INVENTION

Tallow is an important raw material for producing biofuels, such as biodiesel, and can be obtained by rendering animal fats, oil and grease. Meat processing wastewater contains animal fats, oil and grease as waste products that must be removed to clarify the wastewater.

Conventional treatment for clarifying wastewater includes using a clarifier or flotation unit, such as a dissolved air flotation or entrapped air flotation unit, to separate suspended solid particles, including fats, oil and grease, into a solid phase that floats up or sinks down in the treatment units. Unfortunately, conventional treatment removes less than 40% of the fats, oil and grease in the wastewater. Fats, oil and grease can form emulsions with the wastewater and are difficult to separate.

Demulsifying coagulants and flocculants can be used to aid in the removal of fats, oil and grease by breaking oil-in-water emulsions and agglomerating the oil particles. However, coagulants traditionally used often contain inorganic materials, which can be harmful to the environment and can leave residual metals in the fats, oil and grease. These metals become a source of contaminants in the tallow and biodiesel production, which is detrimental to biodiesel reactors and diesel engines.

What is needed is an improved and environmentally friendly process for removing fats, oil and grease from meat processing wastewater and recovering tallow.

BRIEF DESCRIPTION OF THE INVENTION

In one embodiment, a method for recovering tallow from meat processing wastewater comprises adding a coagulant composition to the wastewater to agglomerate suspended fats, oil and grease particles in the wastewater, separating solid waste materials from the wastewater and isolating tallow from the solid waste materials, wherein said coagulant composition comprises tannin.

The various embodiments provide enhanced removal of fats, oil and grease from meat processing wastewaters without the addition of heavy metals and for improved recovery of tallow. The embodiments use tannin, which is a naturally sourced compound that is environmentally friendly.

DETAILED DESCRIPTION OF THE INVENTION

The singular forms "a," "an" and "the" include plural referents unless the context clearly dictates otherwise. The endpoints of all ranges reciting the same characteristic are independently combinable and inclusive of the recited endpoint. All references are incorporated herein by reference.

The modifier "about" used in connection with a quantity is inclusive of the stated value and has the meaning dictated by the context (e.g., includes the tolerance ranges associated with measurement of the particular quantity).

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

In one embodiment, a method for recovering tallow from meat processing wastewater comprises adding a coagulant composition to the wastewater to agglomerate suspended fats, oil and grease particles in the wastewater, separating solid waste materials from the wastewater and isolating tallow from the solid waste materials, wherein said coagulant composition comprises tannin.

Meat processing wastewater is any type of wastewater discharged from meat processing industries, such as food processing wastewater, slaughterhouse wastewater and wastewater from restaurants and other food industries. Meat processing wastewater includes fats, oil and grease from animals, such as cattle, hogs, sheep and poultry. The wastewater may also contain settleable and unsettleable solids and proteinaceous substances.

A coagulant composition is added to the meat processing wastewater to agglomerate suspended fats, oil and grease particles. The composition comprises tannin, which is a naturally sourced and environmentally friendly material. Tannins are astringent water-soluble extracts from the bark, wood, roots, leaves, and fruit of various plants and trees. Examples of barks are wattle, mangrove, oak, eucalyptus, hemlock, pine, larch and willow. Examples of wood are the quebracho chestnut, oak and urunday. Examples of fruits are myrobalans, valonia, dividivi, tara and algarrobilla. Examples of leaves are sumac and gambier. Examples of roots are canaigre and palmetto. Natural tannins can be categorized as hydrolysable tannin or condensed tannin and either type of tannin is suitable for use. The composition and structure of tannin will vary with the source and method of extraction, but the empirical structure is given as $C_{76}H_{52}O_{46}$ with many OH groups attached to the aromatic rings. The extraction and preparation of tannin is a well-known industrial practice.

In one embodiment, the composition comprises a water soluble or dispersible tannin polymer. In another embodiment, the tannin polymer comprises a copolymer of a tannin and a cationic monomer. In one embodiment, the cationic monomer is an ethylenically unsaturated quaternary ammonium ion, an ethylenically unsaturated quaternary phosphonium ion or an ethylenically unsaturated quaternary sulfonium ion. In another embodiment, the ethylenically unsaturated quaternary ammonium ion monomers are quaternary ammonium salts of dialkylaminoalkyl(meth)acrylamides, dialkylaminoalkyl(meth)acrylates or diallyl dialkyl ammonium chlorides. In another embodiment, the cationic monomer is selected from the group consisting of methyl chloride quaternary salt of diethylaminoethyl acrylate, dimethyl sulfate salt of diethylaminoethyl acrylate, dimethylaminoethyl acrylate, dimethylaminoethyl methacrylate, diethylaminoethyl methacrylate, dimethylaminopropyl methacrylamide, dimethylaminopropyl acrylamide, diallyldimethyl ammonium chloride and diallyldiethyl ammonium chloride.

The tannin polymer may optionally contain an anionic monomer and/or a nonionic monomer. In one embodiment, the anionic monomer is an ethylenically unsaturated carboxylic acid or a sulfonic acid functional group. Examples of the anionic monomers include, but are not limited to, acrylic acid, methacrylic acid, vinyl acetic acid, itaconic acid, maleic acid, allylacetic acid, styrene sulfonic acid, 2-acrylamido-2-methyl propane sulfonic acid, 3-allyloxy-2-hydroxypropane sulfonic acid or salts thereof.

In one embodiment, the nonionic monomer is an ethylenically unsaturated nonionic monomer. Examples of the nonionic monomers include, but are not limited to, acrylamide, methacrylamide, N-methylolacrylamide, N,N-dimethylacrylamide, lower alkyl($C_1$-$C_6$)esters, such as vinyl acetate, methyl acrylate, ethyl acrylate or methyl methacrylate, hydroxylated lower alkyl($C_1$-$C_6$)esters, such as hydroxyethyl acrylate, hydroxypropyl acrylate or hydroxyethyl methacrylate, allyl glycidyl ether and ethoxylated allyl ethers of polyethylene glycol, polypropylene glycol or propoxylated acrylate.

In one embodiment, the tannin polymer contains from about 10 to about 80 percent by weight of tannin, from about 20 to about 90 percent by weight of a cationic monomer, from 0 to about 30 percent by weight of a nonionic monomer and from 0 to about 20 percent by weight of an anionic monomer, based on the weight of the tannin polymer. In another embodiment, the tannin polymer contains from about 20 to about 80 percent by weight of tannin, from about 20 to about 80 percent by weight of a cationic monomer, from 0 to about 30 percent by weight of a nonionic monomer and from 0 to about 20 percent by weight of an anionic monomer, based on the weight of the tannin polymer. In another embodiment, the tannin polymer contains from about 30 to about 60 percent by weight of tannin, from about 20 to about 70 percent by weight of a cationic monomer, from 0 to about 30 percent by weight of a nonionic monomer and from 0 to about 20 percent by weight of an anionic monomer, based on the weight of the tannin polymer. In another embodiment, the tannin polymer contains from about 30 to about 55 percent by weight of tannin, from about 20 to about 70 percent by weight of a cationic monomer, from 0 to about 30 percent by weight of a nonionic monomer and from 0 to about 20 percent by weight of an anionic monomer, based on the weight of the tannin polymer.

The tannin polymers may be prepared by mixing the monomers with tannin and initiating by a free radical initiator via solution, precipitation or emulsion polymerization techniques. Conventional initiators, such as azo compounds, persulfates, peroxides and redox couples, may be used. In one embodiment, the initiator is 2,2'azobis(2-amidinopropane) dihydrochloride or a redox initiator pair of t-butylhydroperoxide and sodium metabisulfite. The initiator is present in an amount of from about 0.1 to about 10 percent by weight, based on the weight of the tannin polymer.

The reaction temperature for preparing the tannin polymer is not critical and generally occurs from about 10° C. to about 100° C. In another embodiment, the reaction temperature is from about 40° C. to about 70° C. In one embodiment, the reaction time is from about 10 minutes to about 60 minutes.

The molecular weight of the tannin polymer is not critical, but must be water soluble or dispersible. In one embodiment, the number average molecular weight is from about 500 to about 2,000,000. In another embodiment, the number average molecular weight is from about 5000 to about 200,000.

In one embodiment, the coagulant composition comprises an N,N-(dimethylaminoethyl)methacrylate and tannin (tannin-PolyMADAME). The mole ratio of tannin to N,N-(dimethylaminoethyl)methacrylate is from about 1:0.5 to about 1:5.0.

In another embodiment, the mole ratio is from about 1:1.5 to about 1:3. Tannin-PolyMADAME is available commercially as trade name Coag 250 (CAS No. 925460-60-2) from GE Betz.

The composition may include other cationic and anionic flocculants that do not contain heavy metals, which could contaminate the agglomerated fats, oil and grease. Examples of flocculants that may be added to the composition, include, but are not limited to, polyacrylamide, copolymers of acrylamide with acrylic acid or coagulants, such as clays, zeolites, activated carbon. In one embodiment, the flocculants are methyl chloride quaternary salts of dimethylaminoethyl acrylate or an acrylic acid and acrylamide copolymer or copolymers containing dimethylaminoethyl methacrylate, acrylamidopropyltrimethyl ammonium chloride, methacrylamidopropyltrimethyl ammonium chloride, acrylamidopropyl sulfonate, acrylamide, acrylic acid or mixtures thereof.

The flocculants may be added in any amount suitable for improving the removal of suspended fats, oil and grease in the wastewater. In one embodiment, the amount of flocculant is from 0 to about 80 percent by weight, based on the total weight of the coagulant composition. In another embodiment, the amount of flocculant is from about 1 percent by weight to about 80 percent by weight, based on the total weight of the coagulant composition. In another embodiment, the amount of flocculant is from about 10 percent by weight to about 75 percent by weight, based on the total weight of the coagulant composition.

The coagulant composition is added to the wastewater in any conventional manner and the composition readily disperses within the wastewater. In one embodiment, the coagulant composition is injected to the wastewater. The composition may be added to the wastewater neat or in an aqueous solution either continuously or intermittently. In another embodiment, the coagulant composition is added to the wastewater in conventional wastewater treatment units, such as a clarifier, an entrapped air flotation system or a dissolved air flotation system. The coagulant composition may be preblended and added to the wastewater or each component of the composition may be added separately or may be preblended with one or more of the other components.

The pH of the wastewater may be adjusted before the coagulant composition is added to improve the performance of the coagulant composition. Different flocculants have increased performance at different pH values. In one embodiment, the pH of the wastewater is from about 2 to about 11. In another embodiment, the pH is adjusted to an acidic pH range. In another embodiment, the pH is adjusted to an alkaline pH range. In another embodiment, the pH is adjusted to a neutral pH range. In one embodiment, the pH of the wastewater is adjusted to a pH value in a range from about 4.5 to about 7.5. Acids, such as sulfuric acid, and bases, such as sodium hydroxide may be used to adjust the pH of the wastewater.

The coagulant composition is added in any amount effective for agglomerating suspended fats, oil and grease in wastewater. The actual dosage depends upon the characteristics of the wastewater to be treated. In one embodiment, the coagulant composition is added to the wastewater in an amount of from about 1 part per million by volume to about 1000 parts per million by volume. In another embodiment, the coagulant composition is added to the wastewater in an amount of from about 1 part per million by volume to about 100 parts per million by volume.

Solid waste materials in the wastewater are separated from the wastewater in a solid phase and removed. The solid phase may be separated in any conventional manner. In one embodiment, the solid phase is separated from the wastewater by settling. Conventional treatment units, such as clarifiers or flotation units, such as a dissolved air flotation or entrapped air flotation units, can be used to separate the solid phase from the wastewater.

Solid particles containing fats, oil and grease settle into the solid phase and are removed from the wastewater with the solid phase. Agglomerated particles of fats, oil and grease also settle into the solid phase and are removed from the wastewater with the solid phase.

The solid waste materials removed from the wastewater are processed to isolate and recover tallow. The term "tallow" is used generally to include rendered fats, oil and grease from animals, such as sheep, lamb, poultry, beef and pork and includes the term "lard", which specifically refers to rendered pork fats, oil and grease.

In one embodiment, the solid waste materials are heated and separated in a centrifuge. In one embodiment, the solid waste materials are heated with steam to a temperature in the range of from about 70° C. to about 95° C.

The centrifuge may be any type of conventional centrifuge or tricanter. In one embodiment, the heated solid waste materials are centrifuged from about 1000 G to about 3000 G. The solid waste materials are separated into three phases: water, tallow and a solid phase.

In another embodiment, the quality of the tallow can be improved by adding an acid to the solid waste materials before heat treatment. In another embodiment, the quality of the tallow can be improved by adding an acid to the solid waste materials before heat treatment. The acid reduces insoluble matter, unsaponifiable matter and moisture in the tallow. It is believed that the acid dissolves insoluble matter, which is separated from the tallow during centrifuging, and converts free fatty acids in the tallow into glycerides to reduce unsaponifiable matter. Hygroscopic acids absorb and remove water from the tallow.

In one embodiment, the acid is a mineral acid or an organic acid. Examples of mineral acids include, but are not limited to, sulfuric acid, hydrochloric acid or nitric acid. Examples of organic acids include, but are not limited to, acetic acid, citric acid or tartaric acid. In one embodiment, the acid is added in the range of from about 0.001 g to about 0.3 g of acid per gram of solid waste material. In another embodiment, the acid is added in the range of from about 0.05 g to about 0.3 g of acid per gram of solid waste material.

In order that those skilled in the art will be better able to practice the present disclosure, the following examples are given by way of illustration and not by way of limitation.

EXAMPLES

Efficacy Tests

In order to demonstrate the efficacy of the coagulant composition for removing fats, oil and grease from wastewater, water clarification tests were conducted on meat processing (beef, pork and poultry) wastewater and the suspended Fats, Oil and Grease (FOG), Biochemical Oxygen Demand ($BOD_5$), Total Suspended Solids (TSS), Total Phosphorus (TP), Turbidity, Chemical Oxygen Demand (COD) and Total Kjeldhal Nitrogen (TKN) were measured. The FOG testing was performed in accordance with Hexane Extractable HEM Oil & Grease Test EPA Method 1664 HEM. The $BOD_5$ testing was performed in accordance with Test 5210 B on page 5-2 of "The Standard Methods for the Examination of Water and Wastewater", 18th Edition 1992, American Public Health Association, Washington, D.C. The TSS testing was performed in accordance with Test 2450 D on page 2-56 of "The Standard Methods for the Examination of Water and Wastewater", 18th Edition 1992, American Public Health Association, Washington, D.C. The TP testing was performed in accordance with EPA 600 Method 365.2. The turbidity testing was performed in accordance with EPA Method 180.1. The COD testing was performed in accordance with the Hach Dichromate COD method. The TKN testing was performed in accordance with EPA 600 Method 351.2.

Test Procedure

The procedure used was a standard jar test designed to simulate the operation of a typical wastewater treatment clarifier or Dissolved Air Flotation Unit (DAF) or Entrapped Air Flotation Unit (EAF). The pH of the wastewater was adjusted to a range of from about 2 to about 10. The wastewater was mixed while the coagulant composition was added. The mixing was stopped after two minutes and the solids were allowed to settle. The supernatant or subnatant was analyzed for Turbidity, COD, $BOD_5$, TSS, TKN, FOG and TP.

Example 1

500 ml of poultry wastewater was obtained and was continuously stirred. The pH of the poultry wastewater was measured and adjusted to a range of from about 5.5 to about 6.5 by adding sulfuric acid. 200 ppm of tannin-PolyMADAME (Coag® 250 available from GE Betz.) was added to the wastewater. The pH was raised to a range between about 6.5 and about 7 by adding sodium hydroxide. 26 ppm of a 10/90 methyl chloride quaternary salt of dimethylaminoethyl acrylate/acrylamid copolymer and 13 ppm of a 39/61 acrylic acid/acrylamide copolymer were added to the wastewater. The stirring for the wastewater was stopped after two minutes and the wastewater was allowed to settle. Table 1 contains the lab efficacy test results for Example 1 on poultry wastewater and for CE-1, an untreated poultry wastewater sample.

TABLE 1

|  | CE-1 | Example 1 | Reduction |
|---|---|---|---|
| Coagulant (ppm) | 0 | 239 |  |
| Turbidity (NTU) | 831 | 29 | 97% |
| COD (mg/L) | 4080 | 1019 | 75% |
| $BOD_5$ (mg/L) | 2020 | 633 | 69% |
| TSS (mg/L) | 1579 | 134 | 92% |
| FOG (mg/L) | 360 | 9 | 98% |
| TKN (mg/L) | 286 | 194 | 32% |
| TP (mg/L) | 71 | 64 | 10% |

Example 1 shows increased removal of turbidity, COD, BOD5, TP, TSS, TKN and FOG in the subnatant.

Example 2

500 ml of pork processing wastewater was obtained and was continuously stirred. The pH of the pork wastewater was measured and adjusted to about 6 by adding sodium hydroxide. 5 ppm tannin-PolyMADAME, 10 ppm of a 10/90 methyl chloride quaternary salt of dimethylaminoethyl acrylate/acrylamid copolymer and 5.0 ppm of a 39/61 acrylic acid/acrylamide copolymer were added to the wastewater. The stirring for the wastewater was stopped after 2 minutes and the wastewater was allowed to settle. Table 2 contains the lab efficacy test results for Example 2 on pork wastewater and for CE-2, an untreated pork wastewater sample.

TABLE 2

|  | CE-2 | Example 2 | Reduction |
|---|---|---|---|
| Coagulant (ppm) | 0 | 20 ppm |  |
| Turbidity (NTU) | 267 | 55 | 79% |
| $BOD_5$ (mg/L) | 471 | 206 | 56% |
| TSS (mg/L) | 600 | 97 | 84% |
| FOG (mg/L) | 530 | 7.8 | 99% |

Example 2 shows increased removal of turbidity, $BOD_5$, TSS and FOG in the subnatant.

Example 3

A coagulant composition was prepared by mixing 200 ppm tannin-PolyMADAME, 29 ppm of a 10/90 methyl chloride quaternary salt of dimethylaminoethyl acrylate/acrylamid copolymer and 19 ppm of a 39/61 acrylic acid/acrylamide copolymer. The coagulant composition was added to beef wastewater that was flowing through a 50 gallon per minute (gpm) Entrapped Air Flotation (EAF) unit. Table 3 contains field trial results for Example 3 on the beef wastewater and for CE-3, CE-4 and CE-5, on untreated beef wastewater. CE-3 and CE-4 establish the baseline removal of the tests in the EAF unit. CE-5 is an untreated beef wastewater sample in the EAF unit. Example 3 contains the coagulant composition in the EAF unit. The results in Table 3 are an average of four data points.

TABLE 3

|  | CE-3 | CE-4 | Reduction | CE-5 | Example 3 | Reduction |
|---|---|---|---|---|---|---|
| Coagulant (ppm) | 0 | 0 |  | 0 | 248 |  |
| BOD$_5$ (mg/L) | 9175 | 8825 | 4% | 12,725 | 3425 | 73% |
| TSS (mg/L) | 4600 | 3875 | 16% | 5075 | 1230 | 76% |
| FOG (mg/L) | 4100 | 2375 | 42% | 4175 | 1090 | 74% |
| TKN (mg/L) | 360 | 358 | 1% | 398 | 220 | 45% |
| TP (mg/L) | 64 | 62 | 3% | 88 | 64 | 27% |

Example 3 shows increased removal of BOD$_5$, TSS, FOG, TKN and TP in the treated wastewater compared with conventional water clarification treatment.

Example 4

A small portion of the solid phase that floated up during the CE-4 sample and Example 3 (above) was transferred to two graduated glass centrifuge tubes, forming CE-6 and Example 4, respectively. The exact weight of the solids transferred was recorded. The centrifuge tubes were put in an open steam bath and the tubes were heated until the temperature in the midsection for the solids was 85±2° C. The centrifuge tubes were removed on attaining 85±2° C.

On removing the centrifuge tubes from the steam bath, they were immediately transferred to a bench-top centrifuge and were spun at 1600±100 G for 10 minutes. The centrifuging process separated the solid phase into three distinct layers, tallow, water and solids. The graduated markings on the centrifuge tubes were used to determine the volume fraction of each layer and then the actual mass of tallow recovered.

Since there was a lag time between the actual trial and the time when the solid phase reached the laboratory, the tallow recovery tests were run on several days (19, 41 and 84 days after the trial). Tables 4 and 5 contain data from the tallow recovery tests. Table 4 has the data for Example 4 and Table 5 contains the data for CE-6.

TABLE 4

(Results for Example 4)

| Days from Trial | Sludge Density of Solid Phase from Ex. 3 (g/ml) | Density of Tallow Recovered (g/ml) | Amount of Tallow Recovered (g) | Ratio of Tallow (g):Sludge (g) | Solid Phase from Ex. 3 (L/hr) | Solid Phase from Ex. 3 (Kg/hr) | Tallow Recovered (Kg/hr) |
|---|---|---|---|---|---|---|---|
| 19 | 1.006 | 0.918 | 0.734 | 0.085 | 520.4 | 523.5 | 44.4 |
| 41 | 0.981 | 0.918 | 0.367 | 0.040 | 520.4 | 510.5 | 20.3 |
| 84 | 1.003 | 0.918 | 0.184 | 0.016 | 520.4 | 521.8 | 8.2 |

TABLE 5

(Results for CE-6)

| Days from Trial | Sludge Density of Solid Phase from CE-4 (g/ml) | Density of Tallow Recovered (g/ml) | Amount of Tallow Recovered (g) | Ratio of Tallow (g):Sludge (g) | Solid Phase from CE-4 (L/hr) | Solid Phase from CE-4 (Kg/hr) | Tallow Recovered (Kg/hr) |
|---|---|---|---|---|---|---|---|
| 19 | 0.986 | 0.918 | 2.479 | 0.276 | 42.4 | 41.8 | 11.5 |
| 41 | 0.987 | 0.918 | 2.662 | 0.278 | 42.4 | 41.8 | 11.6 |
| 84 | 0.964 | 0.918 | 2.479 | 0.243 | 42.4 | 40.9 | 9.9 |

Tables 4 and 5 show that on the 19th day after the trial, the tallow recovered from the solid phases of Example 3 had four times the tallow that was recovered from the solid phase of CE-4. Similarly, on the 41st day after the trial, twice as much tallow was recovered from the solid phase of Example 3 than from the solid phase of CE-4. A kinetic equation was developed from the data to estimate the tallow recovery on the day of the trial.

Table 4: Kinetic equation ($R^2=0.980$)

$$\text{Tallow Recovered (Kg/hr)} = 65.625 e^{-0.0253 \, (\text{Days from Trial})}$$

Table 5: Kinetic equation ($R^2=0.862$)

$$\text{Tallow Recovered (Kg/hr)} = 12.428 e^{-0.0025 \, (\text{Days from Trial})}$$

The kinetic estimations provide that if the solid phases are processed (steam heating followed by centrifuging) on the same day that they are generated, the tallow recovered using the coagulant composition is six to eight times that of tallow recovered without the use of the coagulant composition. The primary reason for this increase in tallow recovery is the excess capture of FOG and TSS when the coagulant composition is used, which contributes to the amount of tallow recovered.

Example 5

A small portion of the solid phase removed during the CE-4 sample and Example 3 was transferred to two graduated glass centrifuge tubes, forming CE-7 and Example 5, respectively. The exact weight of the solids transferred was recorded. 0.07 g of sulfuric acid per gram of solid phase was added to acidify the solid phase. The centrifuge tubes were put in an open steam bath and the tubes were heated until the temperature in the mid-section for the solids was 85±2° C. The centrifuge tubes were kept at that temperature for 1 hour.

On removing the centrifuge tubes from the steam bath, they were immediately transferred to a bench-top centrifuge and were spun at 1600±100 G for 10 minutes. The centrifuging process separated the floats into three distinct layers, tallow, water and solids. The graduated markings on the centrifuge tubes were used to determine the volume fraction of each layer and then the actual mass of tallow recovered.

Table 6 contains the tallow quality analysis data for Examples 4 and 5 and for CE-6 and CE-7. The tallow quality was measured for three parameters: moisture and volatile matter, insoluble matter and unsaponifiable matter. The tests were performed in accordance with the American Oil Chemist Society's tests methods: Insoluble Matter—Method AOCS Ca 3A-46, Moisture and Volatile Matter-Method AOCS Ca 3B-38 and Unsaponifiable Matter-Method AOCS Ca 6A-40.

TABLE 6

| | Moisture and Volatile Matter (%) | Insoluble Matter (%) | Unsaponifiable Matter |
|---|---|---|---|
| Example 4 | 1.63 | 0.03 | 1.85 |
| CE-6 | 1.67 | 0.03 | 1.96 |
| Example 5 | 1.32 | 0.02 | 1.26 |
| CE-7 | 1.48 | 0.02 | 1.80 |

Table 6 shows that the quality of tallow in the tallow recovery experiments without acid addition (Example 4 and CE-6) is the same for both the sample without the coagulant composition (CE-6) as for the sample containing the coagulant composition (Example 4). When acid is added to the solid phase (Example 5 and CE-7), the tallow quality improves (Lower numbers indicate improved quality.); however, the improvement is much greater for the sample containing the coagulant composition (Example 5).

While typical embodiments have been set forth for the purpose of illustration, the foregoing descriptions should not be deemed to be a limitation on the scope herein. Accordingly, various modifications, adaptations and alternatives may occur to one skilled in the art without departing from the spirit and scope herein.

What is claimed is:

1. A method for recovering tallow from meat processing wastewater comprising adding a treatment comprising a coagulant composition and a flocculant to the wastewater to agglomerate suspended fats, oil and grease particles in the wastewater, separating solid waste materials from the wastewater and isolating tallow from the solid waste materials, wherein said coagulant composition comprises tannin, and wherein said flocculant is a copolymer containing dimethylaminoethyl methacrylate, acrylamidopropyltrimethyl ammonium chloride, methacrylamidopropyltrimethyl ammonium chloride, acrylamidopropyl sulfonate, acrylamide, acrylic acid or mixtures thereof, said tannin comprising a tannin/N,N-(dimethylaminoethyl) methacrylate polymer, wherein the mole ratio of tannin to N,N-(dimethylaminoethyl) methacrylate is from about 1:0.5 to about 1:5.0.

2. The method of claim 1 wherein the flocculant is present in an amount of from about 1 percent by weight to about 80 percent by weight, based on the total weight of the coagulant composition.

3. The method of claim 1 wherein the pH of the wastewater is adjusted from about 2 to about 11.

4. The method of claim 1 wherein the coagulant composition is added in an amount of from about 1 ppm by volume to about 1000 parts per million by volume.

5. The method of claim 1 wherein the solid waste materials are separated from the wastewater by settling or flotation.

6. The method of claim 1 wherein the solid waste materials are heated from about 80° C. to about 90° C.

7. The method of claim 6 wherein the solid waste materials are separated in a centrifuge.

8. The method of claim 6 further comprising adding an acid to the solid waste materials before heat treatment.

9. The method of claim 8 wherein the acid is a mineral acid or an organic acid.

10. The method of claim 9 wherein the acid is selected from the group consisting of sulfuric acid, hydrochloric acid, nitric acid, acetic acid, citric acid and tartaric acid.

11. The method of claim 8 wherein the acid is added in the range of from about 0.001 g to about 0.3 g of acid per gram of solid waste material.

* * * * *